J. C. OLLARD.
CLUTCH.
APPLICATION FILED FEB. 9, 1915.

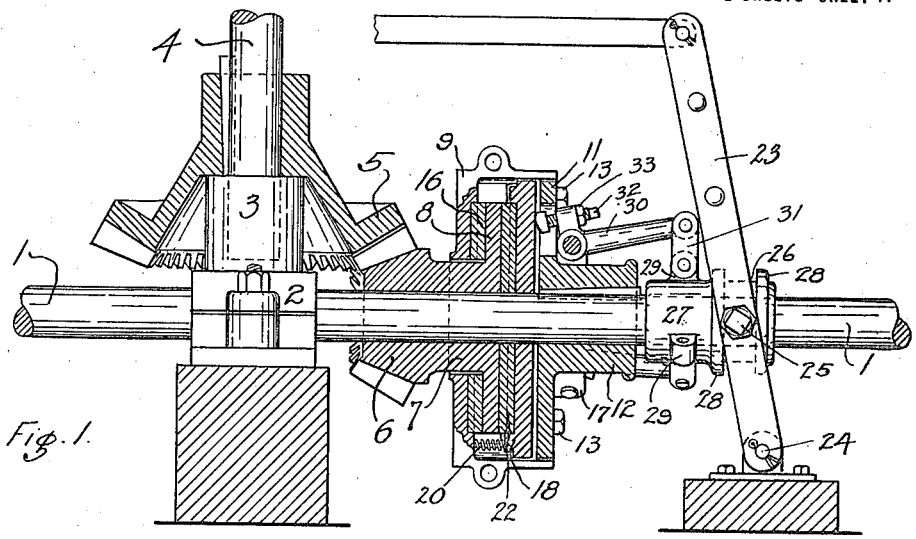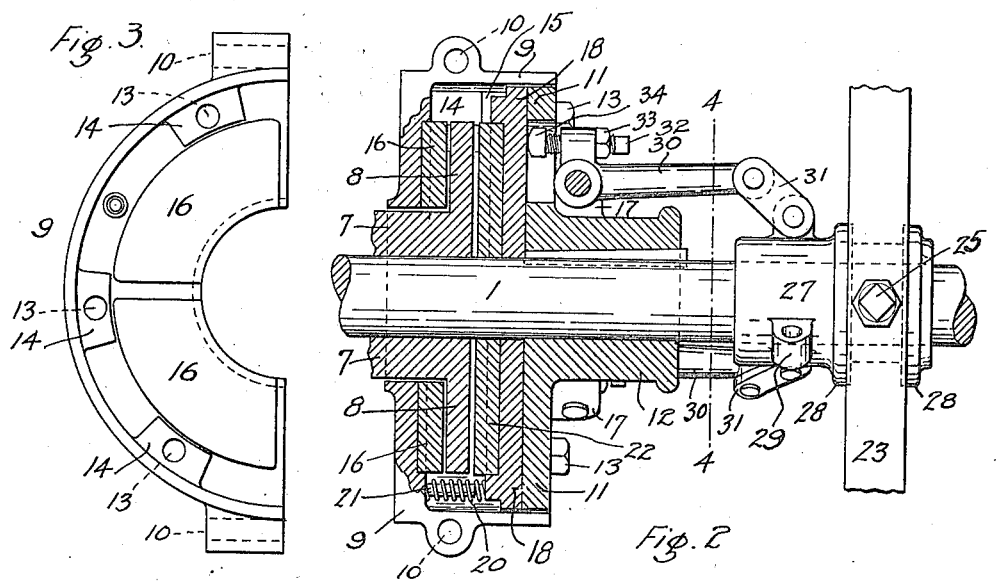

1,183,223.

Patented May 16, 1916.
2 SHEETS—SHEET 2.

Witnesses
J. H. Hyde
M. L. McNeil

Inventor
James C. Ollard
By N. L. Elliott
Attorney

UNITED STATES PATENT OFFICE.

JAMES C. OLLARD, OF TACOMA, WASHINGTON.

CLUTCH.

1,183,223. Specification of Letters Patent. Patented May 16, 1916.

Application filed February 9, 1915. Serial No. 7,200.

*To all whom it may concern:*

Be it known that I, JAMES C. OLLARD, a citizen of the United States, residing at Tacoma, in the county of Pierce, State of Washington, have invented certain new and useful Improvements in Clutches, of which the following is a specification.

This invention relates to friction clutches whereby a shaft may be connected to or disconnected from a rotating shaft without stopping the said rotating shaft, and especially to such a clutch as is adapted for use when the two said shafts are at right-angles to each other.

The objects of the invention are to improve the construction whereby the clutch may be filled with oil to reduce its wear; whereby it may be adjusted for wear; it will grip easily and gradually, if desired; it will be very sensitive to the controlling lever; it will be practically without slip when in its gripping position; and whereby the driven shaft is not moved axially or transversely by the motion in the clutch. I attain these and other objects by the devices, mechanisms and arrangements illustrated by the accompanying drawings, in which—

Figure 4:
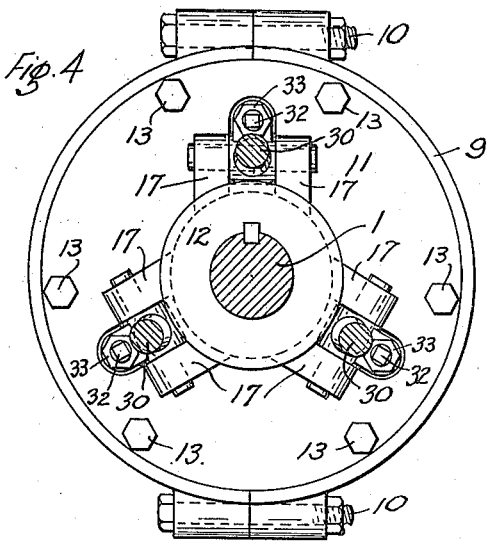
Figure 5:
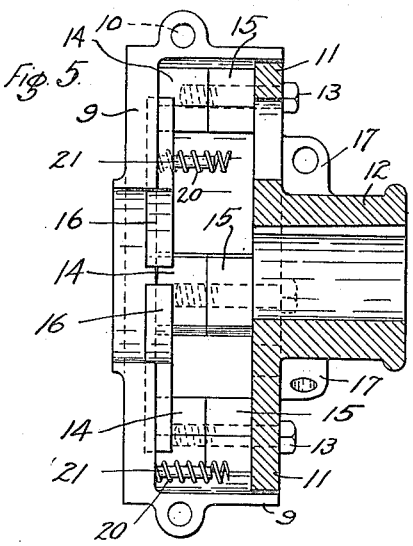
Figure 6:
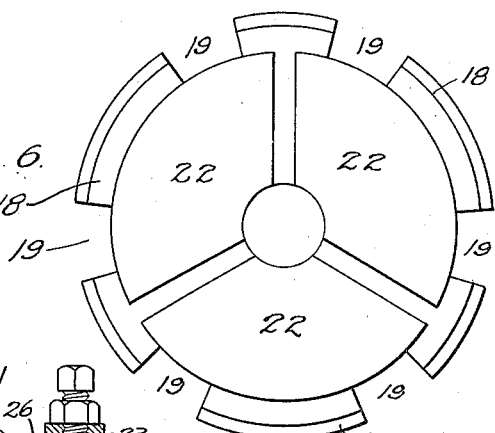
Figure 7:
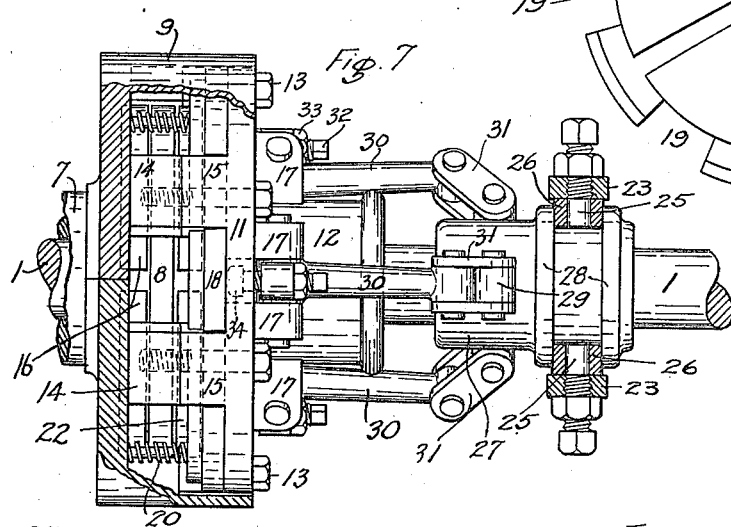

Figure 1 is a longitudinal section of the clutch in gripping position; Fig. 2 is a similar view when in its released position; Fig. 3 is an end elevation of one piece of the clutch drum; Fig. 4 is a front elevation of the complete clutch from the line 4—4 in Fig. 2; Fig. 5 is a section of the clutch drum, showing one-half of the clutch drum removed, the interior mechanism being also removed therefrom; Fig. 6 is a rear elevation of the friction disk; and Fig. 7 is a side elevation of the complete clutch showing, however, a portion of the drum broken away to reveal the interior mechanism.

Similar numerals of reference refer to similar parts throughout the several views.

This device is especially designed for connecting the main engine shaft of a gasolene or other power fishing-boat with the shaft for driving the deck-winch thereof, but may of course be applied to other uses to which it may be adapted.

The shaft 1 is direct connected to the power engine and leads therefrom through the hereinafter described clutch to the propeller shaft clutch (not shown) which may preferably be of the usual positive tooth type. The shaft 1 passes through a bearing 2, suitably supported on the boat frame, and a step bearing 3 is formed on the said bearing 2, as shown in Fig. 1. The end of the winch-shaft 4 is mounted in the step-bearing 3 and has a suitable bevel gear 5 secured thereon. The pinion 6 is loosely mounted on the shaft 1, being free to turn relatively thereto and also has a very slight axial motion thereon. The pinion 6 is provided with a boss extension 7 and a disk 8 is formed on the end of the said boss 7. The friction of the rotating gripping members of the clutch on the two surfaces of the said disk 8 causes the pinion 6 to rotate at a speed determined by the difference between the said driving friction and the resistance of the winch shaft 4.

The clutch mechanism is mounted within a drum which consists of three pieces. Two of these pieces 9 (Fig. 3) are complementary and, when fastened together by the bolts 10, form a hollow chamber through the rear wall of which the boss 7 extends and the flange of which surrounds the disk 8. The other member of the drum is the end disk 11 which fits within the flange formed on the parts 9 and which closes the said chamber formed thereby. The disk 11 is provided with a boss 12 securely fastened to the shaft 1 by a suitable key. The disk 11 is secured to the parts 9 by means of screws 13. The parts 9 have lugs 14 extending inward (Fig. 3) and the piece 11 has corresponding abutting lugs 15 (Fig. 5). The said screws 13 pass through the lugs 15 and screw into the lugs 14. Each piece 9 is provided with two friction blocks 16 (Fig. 3) of hard wood firmly secured therein, said blocks being positioned so as to engage the rearward side of the said disk 8 of the pinion. The end disk 11 is provided with three holes therethrough, and its boss 12 has correspondingly positioned lugs or ears 17 formed thereon, in which the transmitting lever may be fulcrumed.

The friction disk 18 (Fig. 6) is free to slide on the shaft 1 and fits in the clutch drum, having notches 19 in its edge into which the said lugs 15 fit, so that the said disk 18 must rotate with the clutch and the shaft 1. A plurality of springs 20 are mounted on the pins 21 extending from the parts 9. These springs engage the surface of said friction disk 18 so that the said disk is always pushed by said springs toward the disk 11 and away from the front surface of the pinion disk 8. The friction surface of the said disk 18 comprises three blocks 22 of hard wood suitably secured in its rear face and positioned so as to engage the front face of the said disk 8 when it is forced thereagainst.

The operating mechanism consists of a forked lever 23, pivoted to the boat at 24, and having pins 25 engaging a collar 26 surrounding a sleeve mounted on the shaft 1. This sleeve 27 is mounted on the shaft 1 in such a way as to rotate therewith and yet so as to be free to move axially thereon in the usual way. The collar 26 engages between two flanges 28 on the sleeve 27 so that any motion of the lever 23 about its pivot 24 will cause a corresponding motion of the sleeve 27 along the shaft 1. The sleeve 27 has three lugs or ears 29 formed thereon, said ears being positioned so as to correspond with the holes through the disk 11 and with the ears 17. Three transmitting bell-crank levers 30 are fulcrumed between the ears 17, and the actuating ends of said levers 30 extend forward toward the sleeve 27. Short links 31 connect the said ends of the said levers 30 with the corresponding ears 29 on the sleeve 27. The operating ends of said levers 30 are each provided with a screw pin 32, provided with a suitable locking nut 33, and extending through the above mentioned holes in the disk 11 and each having a suitable head 34 engaging the front side of the above described friction disk 18. The position of the said disk 18 along the shaft may therefore be adjusted relatively to the sleeve 27 to take up any wear between the parts 16, 8 and 22. This wear is reduced to the least amount by filling the clutch drum with oil which I find will be readily retained therein if the parts 9 fit easily over the boss 7. The oil reduces the wear and allows the clutching parts to engage each other without shock.

It is evident that any motion of the lever 23 will cause the sleeve 27 to move and that this motion will, through the links 31, cause a slight motion of the three transmitting bell-crank levers 30 about their fulcrums, thus causing a proportionate motion of the screw pins 32 and thus forcing the disk 18 toward the disk 8, if the said sleeve motion is rearward, or will allow the springs 20 to move the said disk 18 away from the disk 8 when the sleeve motion is toward the front. The parts 30, 31 and 27 form a series of toggle connections of great power so that a slight force applied to the sleeve will cause a great force to be applied to the disk 18. When the sleeve 27 is forced back far enough the disk 18 engages the disk 8 and moves it slightly into contact with the disk 16 and then the said disk 8 is gripped between the two disks 16 and 18 by the force applied to the disk 18 by the said transmitting lever 30 and pins 32. This force is controlled by the position of the sleeve 27 on the shaft 1. All parts of the clutch, except the disk 8, rotate with the shaft 1 at all times. When the sleeve 27 is in its extreme working position the parts are clamped together so tightly that there is no slip between the disk 8 and the adjoining friction disks.

Having described my invention, what I claim is:

In a friction clutch, the combination with a rotating shaft; of a boss keyed thereto; a flange extending therefrom and forming a disk 11 concentric with said shaft; substantially rectangular lugs 15 formed on the inner side of said disk near the periphery thereof; an annular body extending over said boss flange and having a rear wall; substantially rectangular lugs 14 formed on the inner side of said annular body in positions corresponding with the similar lugs on the disk and engaging said first lugs; screw means passing through said first lugs and into said second lugs whereby the said flange and annular body form a hollow drum; a driven boss extending through said rear wall and into the drum and being concentric with said driving shaft; a driven disk formed on the end of said driven boss within the drum and of smaller diameter than the distance between opposite lugs 14 in the drum; an axially movable disk mounted within the drum between the driven disk and the disk 11, said disk having peripheral notches into which said lugs 15 fit whereby the said disk rotates with said drum and driving shaft; levers mounted on said boss, one end engaging said movable disk whereby it may be moved to apply frictional contact between said driven disk and the rear wall and the movable disk; and means for operating the other ends of the levers while the shaft is in rotation.

JAMES C. OLLARD.

Witness:
M. F. McNEIL.